(12) United States Patent
Dingman et al.

(10) Patent No.: US 10,798,947 B2
(45) Date of Patent: Oct. 13, 2020

(54) OVEN WITH AUGMENTED REALITY FUNCTIONALITY

(71) Applicant: TPS IP, LLC, Cleveland, OH (US)

(72) Inventors: Lyle Oscar Dingman, East Troy, WI (US); Michael Abraham Schneck, New Berlin, PA (US); Gary Allen Hanson, Janesville, WI (US); David Allen Strand, Burlington, WI (US); Michael Laddie Grande, Elkhorn, WI (US); Geoffry Allen Gromiuk, Mukwonago, WI (US); Steven Edward Kempowski, Oconomowoc, WI (US); Jon Allen Ludlum, Darien, WI (US)

(73) Assignee: TPS IP, LLC, Cleveland, OH (US)

( * ) Notice: Subject to any disclaimer, the term of this patent is extended or adjusted under 35 U.S.C. 154(b) by 279 days.

(21) Appl. No.: 15/922,584

(22) Filed: Mar. 15, 2018

(65) Prior Publication Data
US 2019/0174769 A1 Jun. 13, 2019

Related U.S. Application Data

(60) Provisional application No. 62/596,278, filed on Dec. 8, 2017.

(51) Int. Cl.
*A21B 1/40* (2006.01)
*A21B 3/00* (2006.01)
(Continued)

(52) U.S. Cl.
CPC .................. *A21B 1/40* (2013.01); *A21B 3/00* (2013.01); *F24C 7/085* (2013.01); *G06F 3/0481* (2013.01); *G06F 21/32* (2013.01); *G06T 19/006* (2013.01)

(58) Field of Classification Search
CPC .......... A21B 1/40; G06F 3/0481; G06F 21/32
See application file for complete search history.

(56) References Cited

U.S. PATENT DOCUMENTS

| | | |
|---|---|---|
| RE31,529 E | 3/1984 | Lowe |
| 4,509,553 A | 4/1985 | Hahn |

(Continued)

FOREIGN PATENT DOCUMENTS

| | | | | |
|---|---|---|---|---|
| DE | 102006029902 A1 | * | 1/2008 | ............... A21B 3/02 |
| WO | 2013/171181 A1 | | 11/2013 | |

OTHER PUBLICATIONS

Non-Final Office Action received for U.S. Appl. No. 15/922,623 dated Jul. 25, 2019, 31 pages.

(Continued)

*Primary Examiner* — Sarah Lhymn

(74) *Attorney, Agent, or Firm* — Amin, Turocy & Watson, LLP

(57) ABSTRACT

Techniques for displaying baking information regarding an oven are provided herein. For example, one or more embodiments described herein can comprise a system. The system can comprise a memory that can store computer executable components. The system can further comprise a processor, which can be operably coupled to the memory, that can execute the computer executable components stored in the memory. Also, the computer executable components can comprise an imaging component that can generate one or more images based on baking information regarding an oven. Further, the computer executable components can comprise a display component that displays the image.

18 Claims, 10 Drawing Sheets

(51) Int. Cl.
*G06F 21/32* (2013.01)
*G06F 3/0481* (2013.01)
*G06T 19/00* (2011.01)
*F24C 7/08* (2006.01)

(56) References Cited

U.S. PATENT DOCUMENTS

| | | | |
|---|---|---|---|
| 4,512,362 | A | 4/1985 | Groeschner |
| 4,712,578 | A | 12/1987 | White |
| 4,726,399 | A | 2/1988 | Miller |
| 4,830,054 | A | 5/1989 | Feichtiger et al. |
| 4,913,189 | A | 4/1990 | Kline et al. |
| 5,107,897 | A | 4/1992 | Stoll |
| 5,121,513 | A | 6/1992 | Thomas et al. |
| 5,235,903 | A | 8/1993 | Tippmann |
| 5,417,246 | A | 5/1995 | Perkins et al. |
| 5,657,786 | A | 8/1997 | DuRoss et al. |
| 5,927,337 | A | 7/1999 | LaMantia |
| 5,993,878 | A | 11/1999 | Tippmann |
| 6,578,600 | B1 | 6/2003 | Young, Jr. |
| 6,713,741 | B2 | 3/2004 | Miller |
| 6,766,830 | B2 | 7/2004 | Rondreux et al. |
| 7,191,800 | B2 | 3/2007 | Bemer et al. |
| 7,484,527 | B2 | 2/2009 | Tamaki et al. |
| 8,082,943 | B2 | 12/2011 | Bemer et al. |
| 8,172,546 | B2 | 5/2012 | Cedrone et al. |
| 8,753,097 | B2 | 6/2014 | Cedrone et al. |
| 8,807,164 | B2 | 8/2014 | Baier et al. |
| 9,732,876 | B2 | 8/2017 | Johnson |
| 9,921,641 | B1 * | 3/2018 | Worley, III ............ G06F 3/017 |
| 10,008,037 | B1 * | 6/2018 | Worley, III ........... G06F 3/0304 |
| 10,504,384 | B1 * | 12/2019 | Drake ..................... G06T 11/00 |
| 2003/0061773 | A1 | 4/2003 | O'Leary |
| 2007/0095413 | A1 | 5/2007 | Zhu et al. |
| 2009/0090347 | A1 | 4/2009 | Kim et al. |
| 2009/0194090 | A1 | 8/2009 | Kim et al. |
| 2010/0128755 | A1 * | 5/2010 | Luckhardt ............... F24C 7/087 374/134 |
| 2011/0036826 | A1 | 2/2011 | Feng et al. |
| 2011/0050872 | A1 * | 3/2011 | Harbert .................. G01N 33/12 348/61 |
| 2014/0203012 | A1 * | 7/2014 | Corona .................. H05B 6/687 219/705 |
| 2015/0019017 | A1 | 1/2015 | Bodine et al. |
| 2015/0118632 | A1 | 4/2015 | Liu |
| 2016/0140728 | A1 * | 5/2016 | Aonuma .................. G06F 9/453 382/103 |
| 2016/0160880 | A1 | 6/2016 | Douglas et al. |
| 2016/0187001 | A1 | 6/2016 | Bombardieri et al. |
| 2016/0356388 | A1 | 12/2016 | Inoue |
| 2016/0374501 | A1 | 12/2016 | Logan et al. |
| 2017/0208652 | A1 * | 7/2017 | Luckhardt ............. H04N 5/2256 |
| 2017/0243515 | A1 * | 8/2017 | Vengroff ............... G06F 3/0227 |
| 2018/0032125 | A1 * | 2/2018 | Peterson ................. G06F 3/013 |
| 2018/0062691 | A1 * | 3/2018 | Barnett, Jr. ......... H04M 1/7253 |
| 2018/0101608 | A1 * | 4/2018 | Thysell ................. G06F 16/338 |
| 2018/0114372 | A1 * | 4/2018 | Nagy .................. G06F 3/04842 |
| 2018/0163971 | A1 | 6/2018 | Mizusaki et al. |
| 2018/0181094 | A1 * | 6/2018 | Funk ...................... H04W 4/70 |
| 2018/0345485 | A1 * | 12/2018 | Sinnet ...................... G06T 7/73 |
| 2019/0062084 | A1 | 2/2019 | Delieutraz et al. |
| 2019/0066239 | A1 * | 2/2019 | Touchette ............... G06F 3/011 |
| 2019/0121522 | A1 * | 4/2019 | Davis ................. G02B 27/0093 |
| 2019/0295330 | A1 * | 9/2019 | Nagy ...................... G06T 19/20 |
| 2020/0005669 | A1 * | 1/2020 | Thysell ................ G09B 19/003 |

OTHER PUBLICATIONS

Final Office Action received for U.S. Appl. No. 15/922,623 dated Dec. 16, 2019, 23 pages.
Non-Final Office Action received for U.S. Appl. No. 15/922,605 dated Apr. 3, 2020, 53 pages.
Non-Final Office Action received for U.S. Appl. No. 15/922,445 dated May 29, 2020, 45 pages.
Non-Final Office Action received for U.S. Appl. No. 15/922,569 dated Jun. 8, 2020, 36 pages.
Final Office Action received for U.S. Appl. No. 15/922,519 dated Jun. 8, 2020, 37 pages.

* cited by examiner

OVEN WITH AUGMENTED REALITY FUNCTIONALITY

CROSS-REFERENCE TO RELATED APPLICATIONS

This application claims priority to U.S. Provisional Patent Application Ser. No. 62/596,278 filed on Dec. 8, 2017, entitled "OVEN WITH AUGMENTED REALITY FUNCTIONALITY." The entirety of the aforementioned application is incorporated by reference herein.

TECHNICAL FIELD

The subject disclosure relates to an oven with augmented reality capacities, and more specifically, to an oven with one or more systems and/or computer programs that can facilitate implementing augmented reality and/or modeling displays to convey one or more baking parameters.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can facilitate displaying baking information regarding one or more ovens are described.

According to an embodiment, a system is provided. The system can comprise a memory that can store computer executable components. The system can further comprise a processor, which can be operably coupled to the memory, that can execute the computer executable components stored in the memory. Also, the computer executable components can comprise an imaging component that can generate one or more images based on baking information regarding an oven. Further, the computer executable components can comprise a display component that displays the image.

According to another embodiment, a computer-implemented method is provided. The computer-implemented method can comprise generating, by a system operatively coupled to a processor, an image based on baking information regarding an oven. Also, the computer-implemented method can comprise display, by the system, the image on a display device.

According to another embodiment, a computer product for displaying baking information is provided. The computer product can comprise a computer readable storage medium that can have program instructions embodied therewith. The program instructions can be executable by a processor to cause the processor to generate an image based on baking information regarding an oven. Also, the program instructions can cause the processor to display the image on a display device.

DETAILED DESCRIPTION

Figure 1:
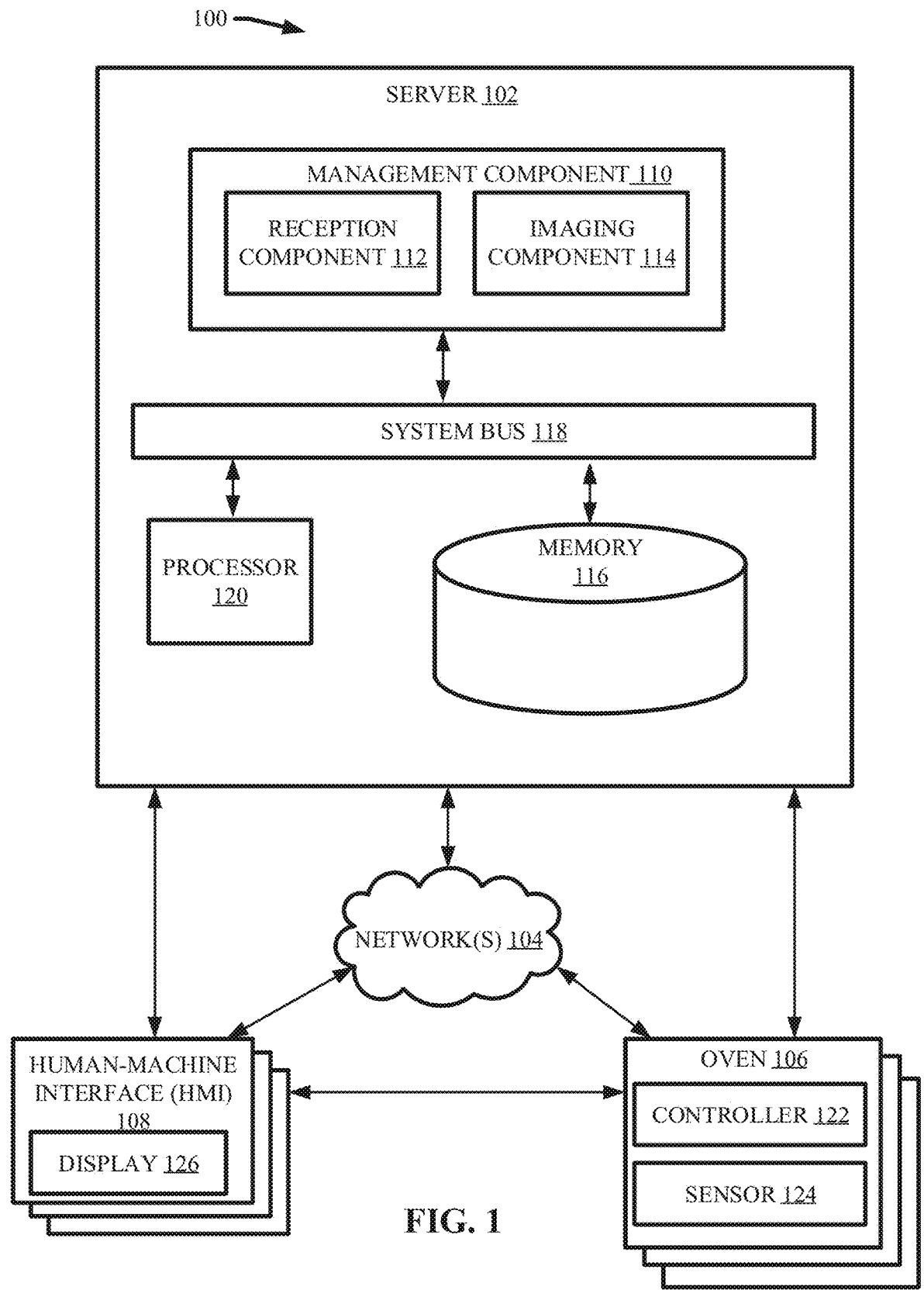
FIG. 1 illustrates a block diagram of an example, non-limiting system that can facilitate displaying baking information regarding an oven in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Provided is a detailed description on cloud computing. The embodiments described herein can be implemented in conjunction with a cloud computer environment. However, it is to be understood that the embodiments described herein are also capable of being implemented in conjunction with any other type of computing environment.

Cloud computing can serve as a convenient and reliable technology for providing an entity with access to a shared pool of computer resources. For example, cloud computing technology can enable an entity to access various networks, servers, computerized devices, software applications, storage, and services comprising the cloud environment. Further, access to the computer resources in the cloud environment can be managed via minimal interaction between the entity and a service provider. In various embodiments, a cloud environment can comprise multiple characteristics, service models, and/or deployment models.

Example characteristics of a cloud environment can include, but are not limited to: on-demand self-service, broad network access, resource pooling, rapid elasticity, and/or measured service. On-demand self-service can enable an entity to unilaterally provision computer resources (e.g., server time and network storage) as need automatically and with or without requiring human interaction with a provider of the computer resources. Cloud computing can provide broad network access over one or more networks via standard mechanisms that are compatible with various client platforms (e.g., mobile devise, computers, and/or personal digital assistants (PDAs).

In various cloud computing embodiments, a service provider's computing resources can be pooled to facilitate serving multiple entities simultaneously and/or sequentially. Different physical and/or virtual resources can be dynamically assigned and/or reassigned to meet the entity's demands. As such, entities utilizing the cloud environment generally have no control or knowledge over the exact location of the pooled resources but may identify a location with a high level of abstraction (e.g., country, state, and/or datacenter).

Additionally, cloud computing capabilities can be rapidly and elastically provisioned. For example, said capabilities can be automatically provisioned to quickly scale out and rapidly scale in. For an entity consuming the services of the cloud environment, capabilities for provisioning can appear to appear vast and available in any desired quantity at any desired time. Cloud computing systems can also automatically control and optimize the use of computer resources by leveraging a metering capability at a level of abstraction in accordance with the type of service provided by the cloud environment (e.g., storage, processing, and/or bandwidth). Computer resources comprising the cloud environment can be monitored, controlled, and/or reported to provide transparency and/or accountability for a consuming entity and/or a provider of the cloud's services.

Example service models of cloud computing can include, but are not limited to: software as a service (SaaS), platform as a service (PaaS), and/or infrastructure as a service (IaaS). In SaaS models, a service provider can enable an entity to use one or more applications (e.g., created by the provider) operating in a cloud infrastructure. Further, an entity can access an application on the cloud environment via one or more client interfaces such as a web browser. In other words, an entity utilizing the application can readily access the application through multiple platforms without having to maintain the cloud infrastructure.

In PaaS models, an entity can deploy their own applications on a cloud environment using programming tools supplied and/or supported by the provider of the cloud infrastructure. In IaaS models, the cloud environment provisions computer resources (e.g., processing, networks, and/or storage) for an entity to utilize when operating arbitrary software such as operating systems and applications. Thus, in the PaaS and/or IaaS models, the entity does not have control over the underlying cloud structure, but can control subject applications (e.g., the operating system) and configurations (e.g., networks and firewalls).

Example deployment models of cloud computing can include, by are not limited to: private clouds, community clouds, public clouds, and/or hybrid clouds. A private cloud model can be operated for a specific entity while denying access/services to alternate parties. The cloud can be managed by the specific entity or a third party and can be located on the entity's premises or off the entities premises. A community cloud can be operated for a plurality of organizations that share a common interest and/or concern (e.g., common mission, common security requirements, common policy, and/or common compliance considerations). Like the private cloud, the community cloud can be managed by one or more of the plurality of organizations and/or a third party.

A public cloud can be operated for the general public and/or a large group of entities (e.g., an industry). Further, public clouds can be owned by an organization that sells cloud services. A hybrid cloud can be a cloud infrastructure comprising two or more different deployment models (e.g., a private cloud and a community cloud). The various deployment models in the hybrid cloud structure can remain unique entities but be bound together by standardized or proprietary technology that can facilitate data and/or application portability (e.g., cloud bursting).

A cloud computer environment can comprise one or more nodes, wherein each node can be a computerized device (e.g., a desktop computer, a laptop computer, a mobile device, a tablet, an automobile system, and/or the like) used by a consumer of cloud services. The nodes can be connected via one or more networks in order to facilitate communication between the nodes and access to the cloud environment. Further, the nodes can be physically and/or virtually grouped in one or more networks to enable one or more deployment models. One of the advantages of cloud computing is the ability to provide services to a consumer via a multitude of platforms without requiring the consumer to sustain and/or maintain computer resources on a specific device.

FIG. 1 illustrates a block diagram of an example, non-limiting system 100 that can facilitate management of augmented reality technologies. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, one more ovens 106, and/or one or more human-machine interfaces (HMI) 108. The server 102 can comprise a management component 110. The management component 110 can further comprise reception component 112 and/or imaging component 114. Also, the one or more servers 102 can comprise or otherwise be associated with at least one memory 116. The server 102 can further comprise a system bus 118 that can couple to various component, such as, but not limited to, the management component 110 and associated components, memory 116, and/or processor 120. While a server 102 is illustrated in FIG. 1, in other embodiments, multiple devices of various types can be associated with or comprise the features shown in FIG. 1.

The one or more networks 104 can comprise wired and wireless networks 104, including, but not limited to, a cellular network, a wide area network (WAN) (e.g., the Internet) or a local area network (LAN). For example, the server 102 can communicate with the one or more ovens 106 (and vice versa) using virtually any desired wired or wireless technology including for example, but not limited to: cellular, WAN, wireless fidelity (Wi-Fi), Wi-Max, WLAN, Bluetooth technology, cloud technology, a combination thereof, and/or the like. Further, although in the embodiment shown the management component 110 can be provided on the one or more servers 102, it should be appreciated that the architecture of system 100 is not so limited. For example, the management component 110, or one or more components of management component 110, can be located at another computer device, such as another server device, a client device, etc. In one or more embodiments, the management component 110, or one or more components of management component 110, can be located at the one or more ovens 106. Further, the various components and/or devices described herein can be accessible to a cloud environment facilitated by the one or more networks 104.

The one or more ovens 106 can vary in size and capacity depending on desired functionality. For example, the one or more ovens 106 can have a volume greater than or equal to 1 cubic foot and less than or equal to 100,000 cubic feet. For instance, the one or more ovens 106 can be commercial and/or industrial size ovens 106 designed to bake manufacturing products. The one or more ovens 106 can be connected to the one or more networks 104 via a wired and/or a wireless connection. For example, the one or more networks 104 can facilitate one or more cloud environments that can be accessed by the one or ovens 106 via one or more wired and/or wireless technologies.

The one or more ovens 106 can comprise one or more controllers 122, which can control one or more baking parameters of the one or more ovens 106. Example baking parameters can include, but are not limited to: temperature, baking durations, pressure, vacuum conditions, quenching parameters, environment composition (e.g., the introduction of one or more fluids), humidity, proportional-integral-derivative (PID) controls, a combination thereof, and/or the like.

The one or more ovens 106 can also comprise one or more sensors 124, which can measure one or more characteristics of one or more products subject to a bake within the one or more ovens 106. The one or more sensors 124 can detect, observe, and/or measure one or more product characteristics of one or more products within the one or more ovens 106, which can include, but are not limited to: size of the one or more products (e.g., length, width, and/or height dimensions), weight of the one or ore products, temperature of the one or more products, color of the one or more products, hardness of the one or more products, a combination thereof, and/or the like. Example devices that can comprise the one or more sensors 124 can include, but are not limited to: thermometers, lasers, scales, cameras (e.g., thermal imaging cameras, motion cameras, infrared cameras, and/or digital cameras), barometers, pressure sensors, infrared sensors, a combination thereof, and/or the like. Additionally, the one or more sensors 124 can comprise remote controlled drones (e.g., miniature drones and/or micro-sized drones) that can house the various example devices described herein. The one or more drones can be located within the oven 106 and can travel along predefined paths and/or routes.

The one or more HMIs 108 can facilitate interactions between one or more users of the system 100 and one or more images and/or models generated by the system 100. The HMIs 108 can be computerized devices. In one or more embodiments, the HMIs 108 can comprise a processor (e.g., a microprocess). Example devices that can comprise the one or more HMIs 108 include, but are not limited to: computer tablets, personal computers, desktop computers, smart devices (e.g., smart phones and/or smart wearables such as smart watches, bracelets, and/or glasses), a combination thereof, and/or the like. The one or more HMIs 108 can be connected to the one or more servers 102 and/or the one or more ovens 106 directly and/or via the one or more networks 104. For example, the one or more HMIs 108 can utilize wireless technology (e.g., LAN, cellular networks, and/or Bluetooth technology) to interface with various components and/or devices of the system 100. The one or more HMIs 108 can further comprise one or more displays 126. Example devices that can comprise the one or more displays 126 can include, but are not limited to: light-emitting diode displays (LED), plasma display panels (PDP), touch displays, cathode ray tube (CRT) displays, electroluminescent displays (ELD), liquid crystal displays (LCD), organic light-emitting diode displays (OLED), a combination thereof, and/or the like.

The reception component 112 can be connected to the one or more ovens 106 and/or the one or more HMIs 108 directly or via the one or more networks 104. The reception component 112 can receive baking parameters (e.g., via the one or more controllers 122) and/or product characteristics (e.g., via the one or more sensors 124) from the one or more ovens 106. Additionally, the reception component 112 can receive one or more requests and/or signals from the one or more HMIs 108.

The one or more controllers 122 can send one or more baking parameters to the reception component 112 (e.g., via the one or more networks 104). For example, the one or more controllers 122 can send one or more baking parameters to the reception component 112 at the start of each bake for a respective oven 106 associated with the subject controller 122. In another example, the one or more controllers 122 can send one or more baking parameters to the reception component 112 in time intervals (e.g., every minute, every five minutes, every ten minutes, every fifteen minutes, every thirty minutes, every hour, etc.). Included in the baking parameters, can be one or more identifiers that indicate the particular oven 106 associated with said baking parameters. The reception component 112 can receive the baking parameters and store said baking parameters in the memory 116 and/or share said baking parameters with the various server 102 components (e.g., the imaging component 114).

Similarly, the one or more sensors 124 can send one or more product characteristics to the reception component 112 (e.g., via the one or more networks 104). For example, the one or more sensors 124 can send one or more product characteristics to the reception component 112 at the start of each bake for a respect oven 106 associated with the subject sensor 124. In another example, the one or more sensors 124 can send one or more product characteristics to the reception component 112 in time intervals (e.g., every minute, every five minutes, every ten minutes, every fifteen minutes, every thirty minutes, every hour, etc.). In a further example, the one or more sensors 124 can send the product characteristics to the reception component 112 in response to a product characteristic reaching a predefined threshold (e.g., a product being baked in the oven 106 reaching a certain temperature). Included in the product characteristics, can be one or more identifiers that indicate the particular oven 106 associated with said product characteristics. The reception component 112 can receive the product characteristics and store said product characteristics in the memory 116 and/or share said product characteristics with the various server 102 components (e.g., the imaging component 114).

The imaging component 114 can generate one or more images based on the baking parameters and/or the product characteristics received by the reception component 112.

The one or more images generated by the imaging component 114 can convey information (e.g., regarding the baking parameters and/or the product parameters) for a subject bake by a subject oven 106 to a user of the system 100. The images generated by the imaging component 114 can include, but are not limited to: designs, figures, text, pictures, arrows, symbols, photos, videos, and/or a combination thereof. Further, the images can be two-dimensional (2D) or three-dimensional (3D). For example, the images generated by the imaging component 114 can convey the baking parameters and/or the product characteristics. For instance, an image generated by the imaging component 114 can comprise a clock counting down the runtime of a subject bake (e.g., wherein the runtime of the subject bake was received as a baking parameter from one or more controllers 122) and/or text indicating the temperature of a product within a subject oven 106 (e.g., wherein the temperature was received as a product characteristic received from one or more sensors 124). Thus, the imaging component 114 can generate one or more images, in various aesthetic formats, which can convey baking parameters and/or product characteristics regarding a subject bake and/or a subject oven 106.

A user of the system 100 can view the one or more images generated by the imaging component 114 via the one or more HMIs 108 (e.g., via the one or more displays 126). In one or more embodiments, a user of the system 100 can request the one or more images from the one or more servers 102 via one or more input devices of the one or more HMIs 108. Example input devices can include, but are not limited to: keyboards (e.g., virtual and/or tangible keyboards), buttons (e.g., virtual and/or tangible buttons), a mouse, digital pens, a combination thereof, and/or the like. Thus, the one or more HMIs 108 can generate one or more requests regarding a subject bake and/or subject oven 106, and send said one or more requests to the reception component 112 (e.g., via the one or more networks 104). The reception component 112 can then share the one or more requests with the imaging component 114, whereupon the imaging component 114 can send one or more generated images regarding the one or more requests to the subject one or more HMIs 108 (e.g., via the one or more networks 104). Upon receiving the one or more images generated by the imaging component 114 and regarding the subject request, the subject HMI 108 can illustrate said one or more images via one or more displays 126. For example, the HMI 108 can be a computerized tablet, wherein a user of the HMI 108 can utilize a virtual keyboard (e.g., via a touch screen) to generate one or more requests for information regarding a particular bake by a particular oven 106. Said requests can then be sent to the one or more servers 102 (e.g., via the one or more networks 104), whereupon one or more images regarding said one or more requests can be generated (e.g., by the imaging component 114) and sent to the HMI 108 (e.g., via the one or more networks 104). The HMI 108 can then display (e.g., via the one or more displays 126) the one or more images for a user of the system 100. Thus, a user of the system 100 can see an image (e.g., via one or more displays 126) that can convey baking parameters and/or product characteristics regarding a bake and/or oven 106, which could have been identified by one or more user requests (e.g., via one or more HMIs 108).

In various embodiments, the one or more requests can be generated by the one or more HMIs 108 automatically (e.g., without user input). For example, the HMI 108 can utilize geofencing technology (e.g., via global positioning systems (GPS) and/or radio-frequency identification (RFID)) to automatically trigger a general request from any and all servers 102 and/or ovens 106 within a given area. For instance, a server 102 can be located near (e.g., adjacent) and/or connected to an oven 106, and when a HMI 108 comes within a predetermined proximity to the server 102, and thereby the oven 106, geofencing technology comprising the HMI 108 can trigger the automatic generation of a request to receive one or more generated images; whereupon said server 102 can generate and send one or more images regarding the nearby oven 106 (e.g., baking parameters and/or product characteristics) to the HMI 108. Thus, a user of the HMI 108 can view (e.g., via one or more displays 126) one or more images regarding a subject oven 106 as an automatic response to approaching said oven 106. In another instance, the server 102 can be located near and/or adjacent to a plurality of ovens 106 (e.g., located in a room), geofence technology comprising the HMI 108 can be triggered upon approaching the server 102 (e.g., entering the room), and a request, which can be automatically generated in response to the geofence triggering, can illicit images regard each oven 106 from the plurality of ovens 106. In other examples, the HMI 108 can generate one or more automatic requests utilizing technology other than geofencing, such as: Bluetooth technology (e.g., in response to pairing and/or connecting the subject HMI with one or more servers 102 and/or ovens 106), quick response (QR) codes, a combination thereof, and/or the like.

In the various embodiments described herein, the one or more HMIs 108 can display the one or more images overlaying an environment in which the one or more servers 102 and/or one or more ovens 106 are located. For example, the one or more HMIs 108 can be smart glasses and can be worn by a user of the system 100. A subject HMI 108 can project and/or otherwise display the one or more images on one or more lenses (e.g., transparent lenses) of the smart glasses. Further, the one or more images can be reserved to only a portion of the one or more lenses and/or can be displayed with varying levels of transparency so as to enable an environment past the lenses to be visible to the user despite the presence of the one or more images on the one or more lenses. In another example, one or more cameras comprising the one or more HMIs 108 can capture one or more images of a user's environment (e.g., of a subject oven 106 within view of the user) and overlay the received images (e.g., generated by the imaging component 114) onto the one or more captured images. Thus, the one or more HMIs 108 can generate one or more displays to a user that can comprise augmentations to a reality that is the user's visible environment, wherein said augmentations can comprise one or more images that can convey information regarding one or more ovens 106 in said visible environment.

Figure 2:
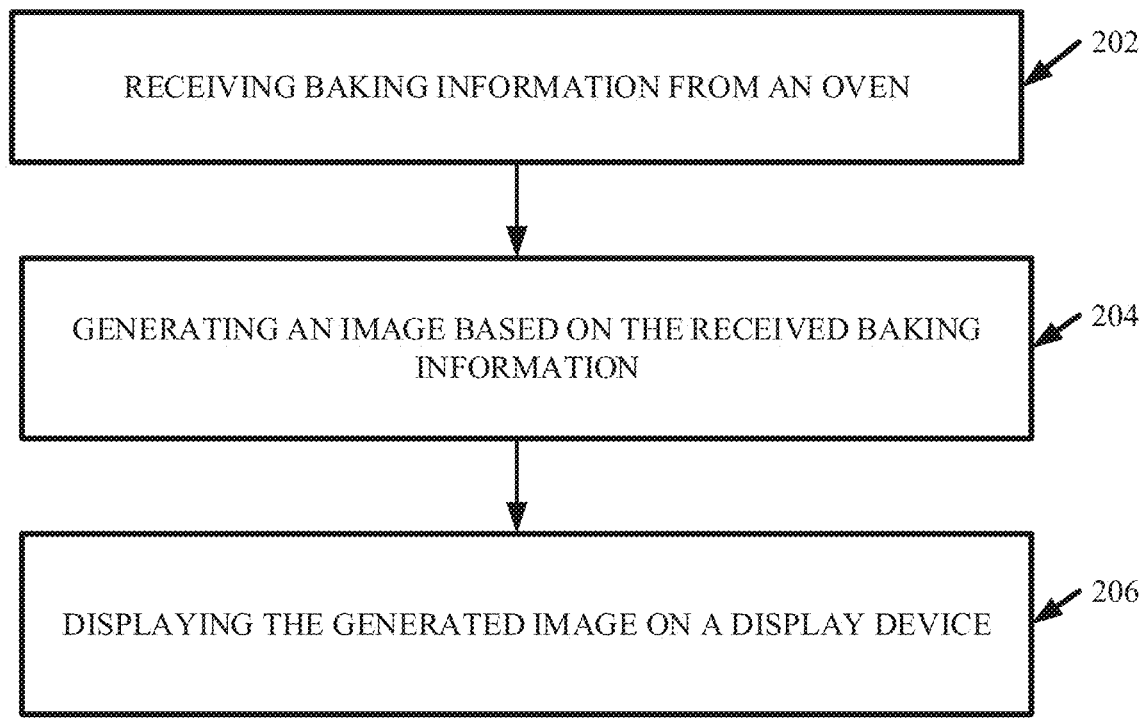
FIG. 2 illustrates a flow diagram of an example, non-limiting method that can facilitate displaying baking information regarding an oven in accordance with one or more embodiments described herein.

FIG. 2 illustrates a flow diagram of an example, non-limiting method 200 that can facilitate conveying baking information via the system 100 in accordance with one or more embodiments described herein. Repetitive description of like elements employed in other embodiments described herein is omitted for sake of brevity.

At 202, the method 200 can comprising receiving baking information from an oven 106. The baking information can comprise baking parameters and/or product characteristics regarding a bake and/or an oven 106. The baking information can be received (e.g., by reception component 112) from one or more ovens 106 (e.g., one or more controllers 122 and/or one or more sensors 124) via one or more networks 104.

At 204, the method 200 can comprise generating one or more images (e.g., by imaging component 114) based on the received baking information. The one or more images can comprise designs, symbols, text, figures, graphs, photos, videos, a combination thereof, and/or the like. The one or more images can illustrate and/or otherwise convey the received baking information (e.g., baking parameters and/or product characteristics). The one or more images can be generated in response to receiving the baking information and/or can be generated in response to receiving a request regarding the baking information from a user (e.g., via a HMI 108). Further, the request can be generated by an HMI 108 through manual input of a user of the system 100 and/or can be generated automatically (e.g., in response to meeting one or more conditions such as proximity to a server 102 and/or oven 106).

At 206, the method 200 can comprise displaying the generated one or more images on one or more display devices (e.g., displays 126) for a user of the system 100 to view. The one or more images can be displayed by one or more HMIs 108 operated by the user of the system 100. Also, the one or more images can be sent to the one or more HMIs 108 in response to a request generated by the one or more HMIs 108. In various embodiments, displaying the generated one or more images can comprise overlaying said one or more images over a visual presentation of the user's environment. For example, one or more cameras of the HMIs 108 can capture one or more images of the user's environment and the one or more generated images can be over-laid onto said one or more captured images; thereby generating an illustration of the user's environment augmented by the one or more generated images to present baking information. In another example, the one or more generated images can be presented (e.g., via a smart wearable such as smart glasses) within a user's field of vision as the user views her surroundings (e.g., presented on a lens through which the user views her environment); thereby generating an illustration of the user's environment augmented by the one or more generated images to present baking information.

Figure 3:
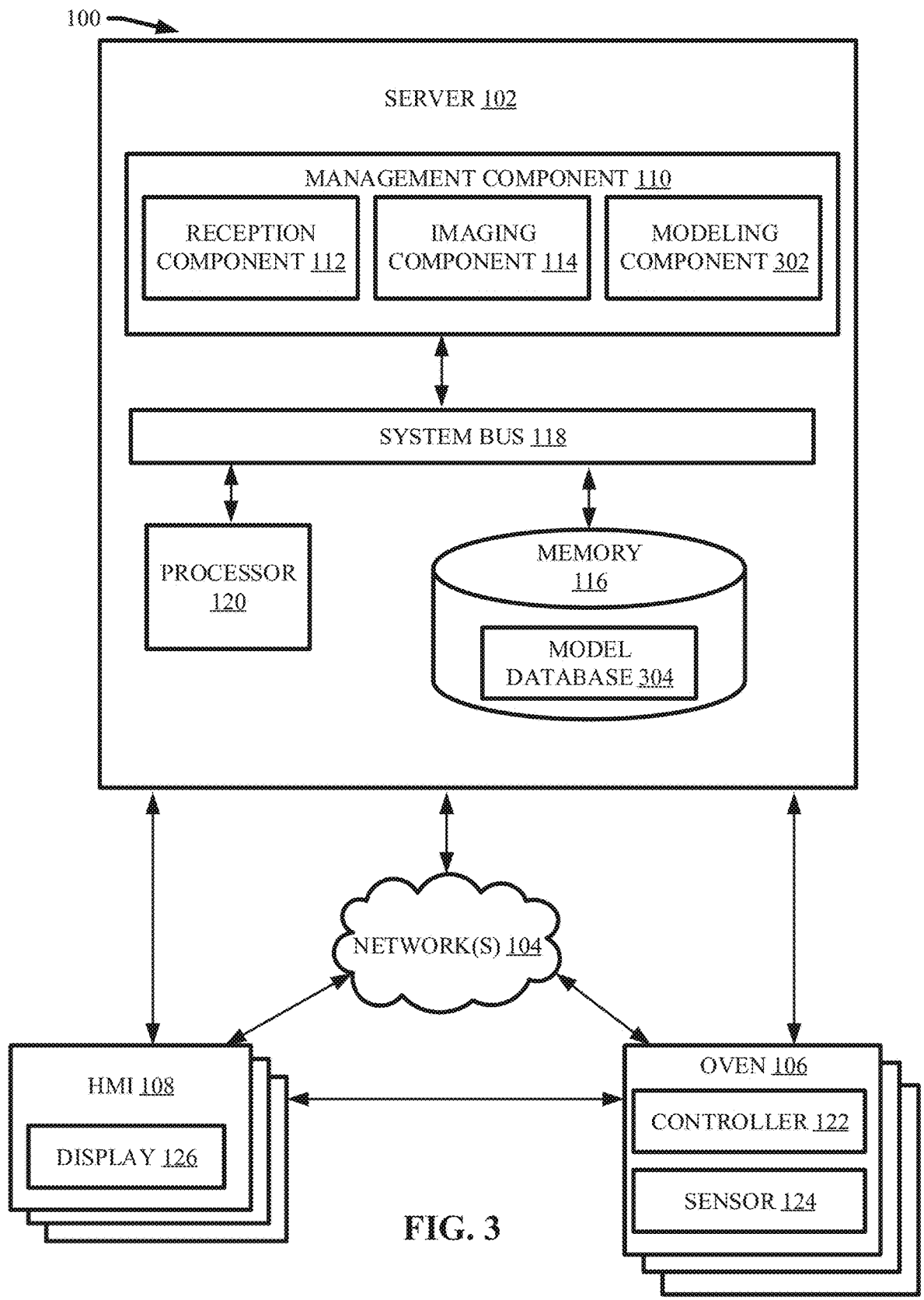
FIG. 3 illustrates another block diagram of an example, non-limiting system that can facilitate displaying baking information regarding an oven in accordance with one or more embodiments described herein.

FIG. 3 illustrates a block diagram of the example, non-limiting system 100 further comprising modeling component 302. Repetitive description of like elements employed in other embodiments described herein is omitted for sake of brevity.

The modeling component 302 can generate one or more models regarding baking parameters and/or product characteristics of a bake and/or oven 106. The modeling component 302 can receive the baking parameters and/or product characteristics from the one or more ovens 106 (e.g., one or more controllers 122 and/or one or more sensors 124) via the reception component 112 and/or the one or more networks 104. The one or more models generated by the modeling component 302 can be 2D and/or 3D models. Also, the one or more models can present structural representations of one or more products being baked (e.g., based on received product characteristics). In various embodiments, the one or more generated models can be interactive. For example, the one or more models can rotate (e.g., 360 degrees) to illustrate various view points of a virtual structure (e.g., a structure representing one or more baking parameters and/or product characteristics). Additionally, the one or more generated models can be stored in a model database 304, which can be stored in the memory 116.

The one or more HMIs 108 can request one or more of the models generated by the modeling component 302 and/or stored in the model database 304 in accordance with the various features described herein regarding one or more images generated by the imaging component 114. For example, the requests generated by the one or more HMIs 108 can initiate retrieval of: one or more images generated by the imaging component 114, one or more models generated by the modeling component 302, and/or a combination thereof. For instance, the one or more HMIs 108 can request one or more models in response to user input and/or one or more predefined conditions (e.g., proximity of the subject HMI 108 to a server 102 and/or an oven 106).

Further, upon receiving one or more generated models from the server 102 (e.g., via the one or more networks), the one or more HMIs 108 can display the one or more models in accordance with the various features described herein regarding one or more images generated by the imaging component 114. For example, the one or more models (e.g., generated by modeling component 302) can be displayed (e.g., via one or more displays 126) by one or more of the HMIs 108. In various embodiments, the one or more HMIs 108 can display the one or more models to visually augment the surrounding of a user of the system 100. For instance, the one or more HMIs 108 can capture one or more images of the user's surroundings and overlay the one or more generated models onto the one or more captured images. In another instance, the one or more HMIs 108 can present (e.g., via a smart wearable such as smart glasses comprising a lens display) the one or generated models within a user's line of sight as the user views her surroundings.

By viewing a model generated by the one or more servers 102 (e.g., via modeling component 302) a user of the system 100 can view a virtual representation of what is happening within an oven 106. For example, a user can view models and/or images regarding baking parameters and/or product characteristics of a bake without opening and/or otherwise manipulating a subject oven 106. Further, said models and/or images can be presented to a user in response to user input and/or in response to user activity (e.g., approaching an oven 106) so as to facilitate quick and convenient access to the subject information. Moreover, the manner of display in the various embodiments described herein can increase safety conditions around one or more servers 102 and/or ovens 106 by allowing a user of the system 100 to view baking parameters and/or product characteristics without impeding the users' view of her surroundings.

Figure 4:
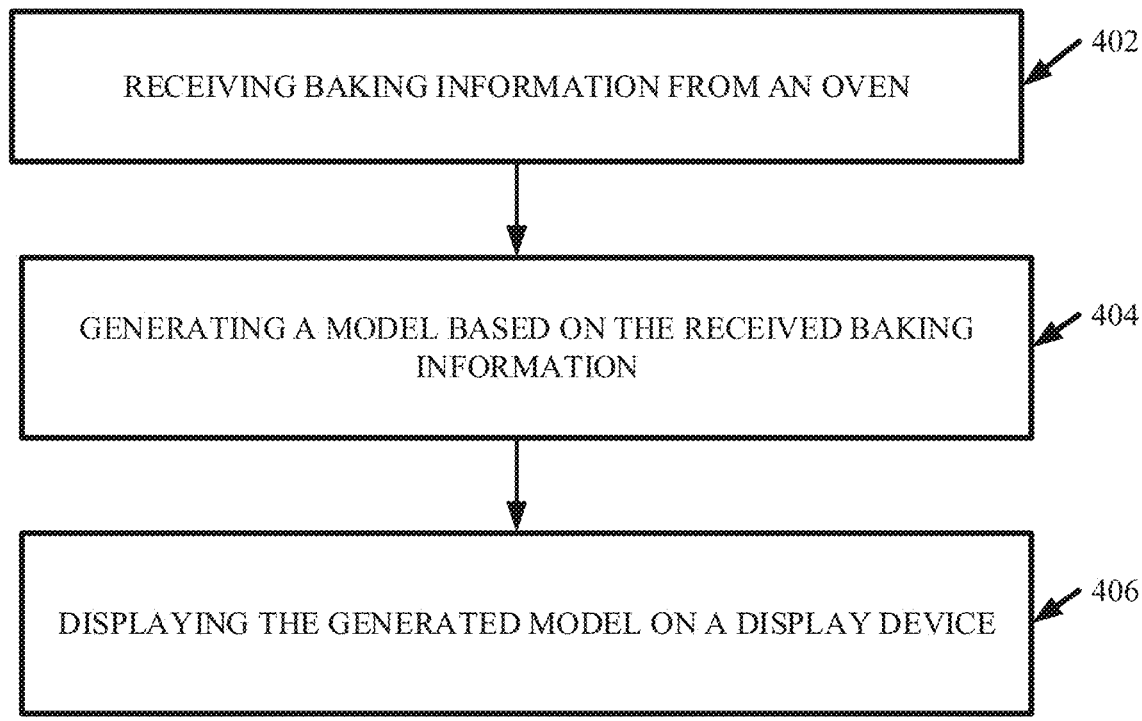
FIG. 4 illustrates another flow diagram of an example, non-limiting method that can facilitate displaying baking information regarding an oven in accordance with one or more embodiments described herein.

FIG. 4 illustrates a flow diagram of an example, non-limiting method 400 that can facilitate conveying baking information via the system 100 in accordance with one or more embodiments described herein. Repetitive description of like elements employed in other embodiments described herein is omitted for sake of brevity.

At 402, the method 400 can comprising receiving baking information from an oven 106. The baking information can comprise baking parameters and/or product characteristics regarding a bake and/or an oven 106. The baking information can be received (e.g., by reception component 112) from one or more ovens 106 (e.g., one or more controllers 122 and/or one or more sensors 124) via one or more networks 104.

At 404, the method 400 can comprise generating one or more models (e.g., by modeling component 302) based on the received baking information. The one or more models can comprise designs, symbols, text, figures, graphs, photos, videos, virtual structures, a combination thereof, and/or the like. The one or more models can illustrate and/or otherwise convey the received baking information (e.g., baking parameters and/or product characteristics). The one or more models can be generated in response to receiving the baking information and/or can be generated in response to receiving a request regarding the baking information from a user (e.g., via a HMI 108). Further, the request can be generated by an HMI 108 through manual input of a user of the system 100 and/or can be generated automatically (e.g., in response to meeting one or more conditions such as proximity to a server 102 and/or oven 106).

At 406, the method 400 can comprise displaying the generated one or more models on one or more display devices (e.g., displays 126) for a user of the system 100 to view. The one or more models can be displayed by one or more HMIs 108 operated by the user of the system 100. Also, the one or more models can be sent to the one or more HMIs 108 in response to a request generated by the one or more HMIs 108. In various embodiments, displaying the generated one or more models can comprise overlaying said one or more models over a visual presentation of the user's environment. For example, one or more cameras of the HMIs 108 can capture one or more images of the user's environment and the one or more generated models can be over-laid onto said one or more captured images; thereby generating an illustration of the user's environment augmented by the one or more generated models to present baking information. In another example, the one or more generated models can be presented (e.g., via a smart wearable such as smart glasses) within a user's field of vision as the user views her surroundings (e.g., presented on a lens through which the user views her environment); thereby generating an illustration of the user's environment augmented by the one or more generated models to present baking information.

Figure 5:
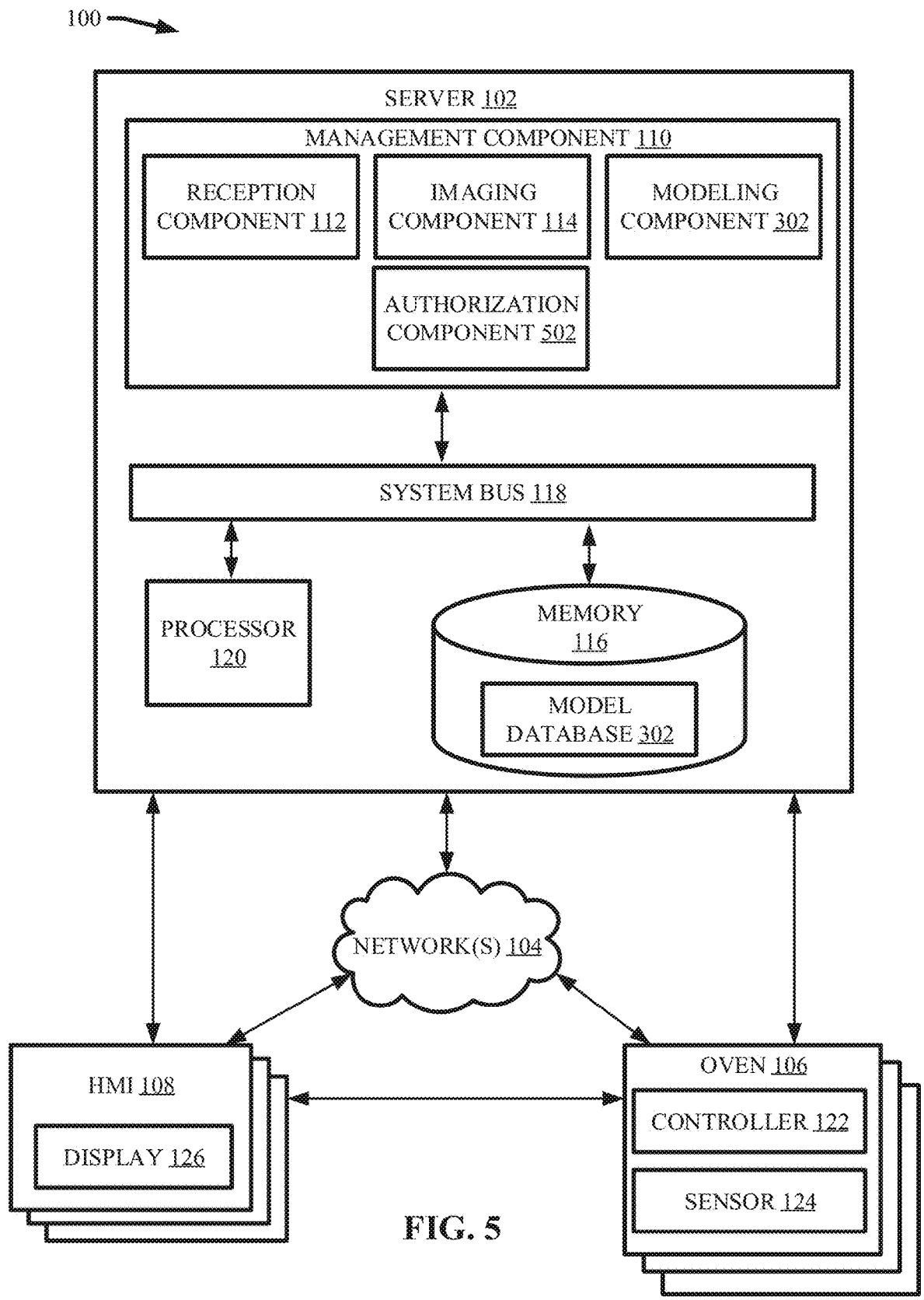
FIG. 5 illustrates another block diagram of an example, non-limiting system that can facilitate locking and/or displaying baking information regarding an oven in accordance with one or more embodiments described herein.

FIG. 5 illustrates a block diagram of the example, non-limiting system 100 further comprising authorization component 502. Repetitive description of like elements employed in other embodiments described herein is omitted for sake of brevity.

The authorization component 502 can generate one or more locks (e.g., virtual locks) regarding one or more generated images (e.g., by the imaging component 114) and/or models (e.g., by the modeling component 302). For example, the one or more locks generated by the authorization component 502 can comprise password protection, biometric protection, and/or encryption technologies. One or more features of the generated images and/or models can be locked by the authorization component 502 to restrict their visibility. For example, the one or more generated images and/or models can comprise one or more layers, wherein each layer can comprise a feature of the general image and/or model. The authorization component 502 can restrict one or more of said layers, and thereby said features, from general inspection. Thus, a portion of a generated image and/or model can be hidden from display by the one or more HMIs 108 unless unlocked (e.g., via a password and/or an encryption key) by a user of the system 100.

The authorization component 502 can lock one or more features of the generated images and/or models in response to said images and/or models being generated. Further, the authorization component 502 can choose which features of said images and/or models to lock based on one or more security preferences. An authorized user of the system 100 can define the security preferences via one or more input devices of the one or more HMIs 108. Also, the one or more security preferences can be based on the baking parameters, the product characteristics, and/or the subject oven 106. For example, the one or more security preferences can stipulate that the product characteristics associated with a particular oven 106 can be visible to all users of the system 100; however, the baking parameters of said oven 106 are to be locked by the authorization component 502, thereby requiring authorized credentials in order to view portions of generated images and/or models that portray said baking parameters.

Additionally, the one or more security preferences can define the authorization credentials that can unlock particular features. For example, the authorization component 502 can generate one or more locks that all require the same level of security clearance (e.g., the same category of authorization credentials) to unlock. In another example, the authorization component 502 can generate one or more first locks, which can be unlocked by a first level of security clearance (e.g., a first category of authorization credentials), and one or more second locks, which can be unlocked by a second level of security clearance (e.g., a second category of authorization credentials); wherein the security preferences can indicate which features are to be subjected to the first lock and/or which other features are to be subject to the second lock. Thus, certain authorization credentials can have the potential to unlock more or less features of the one or more generated images and/or models than other authorization credentials.

The server 102 can send the one or more generated images and/or models in their entirety (e.g., including locked features) to the one or more HMIs 108 in response to one or more requests generated by the one or more HMIs 108. Despite possessing the entire generated images and/or models, the HMIs 108 can only display (e.g., via one or more displays 126) portions of the generated images and/or models that have not been locked by the authorization component 502, until said locked portions are unlocked. A user of the system 100 can unlock one or more locked portions, and thereby view said portions, by inputting authorization credentials (e.g., a password, an encryption key, and/or a biometric) into the one or more HMIs 108.

Figure 6:
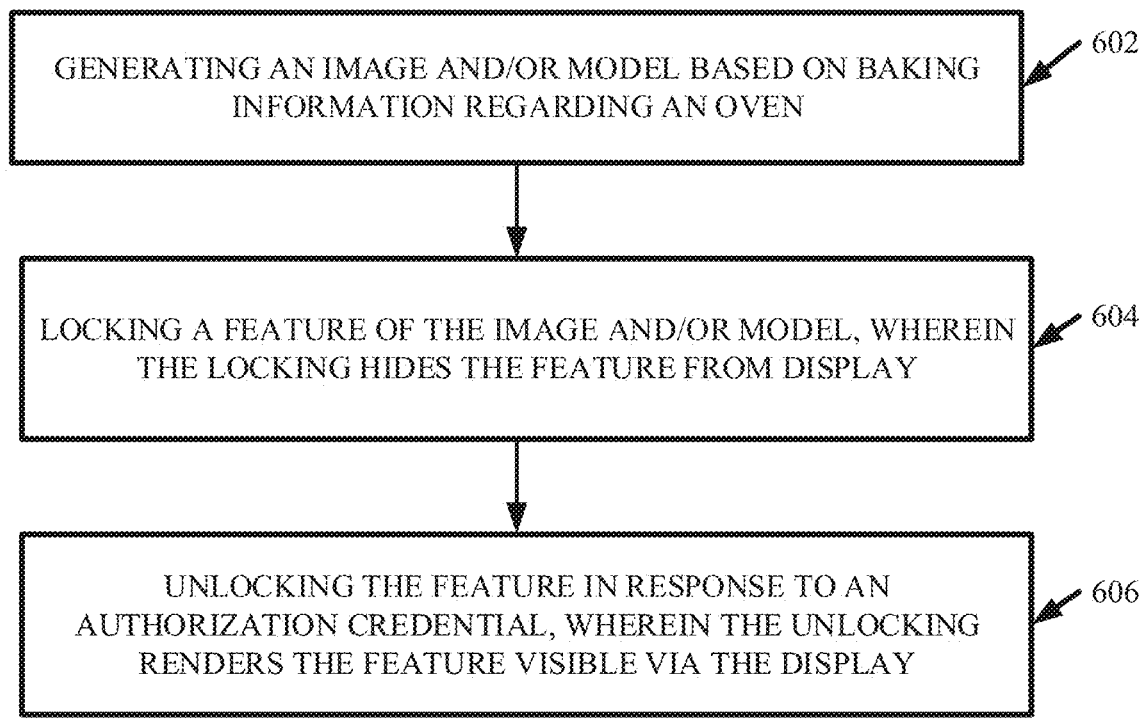
FIG. 6 illustrates a flow diagram of an example, non-limiting method that can facilitate locking and/or unlocking baking information regarding an oven in accordance with one or more embodiments described herein.

FIG. 6 illustrates a flow diagram of an example, non-limiting method 600 that can facilitate locking and/or unlocking one or more features generated by the system 100 in accordance with one or more embodiments described herein. Repetitive description of like elements employed in other embodiments described herein is omitted for sake of brevity.

At 602, the method 600 can comprise generating one or more images and/or one or more models (e.g., by imaging component 114 and/or modeling component 302) based on baking information (e.g., baking parameters and/or product characteristics) regarding an oven 106. The one or more images and/or one or more models can be 2D and/or 3D, and can comprise a plurality of features (e.g., text, figures, designs, structures, graphs, photos, videos, a combination thereof, and/or the like). For example, the one or more images and/or models can comprise a plurality of layers, wherein each layer comprises one or more features.

At 604, the method 600 can comprise locking (e.g., via authorization component 502) one or more features (e.g., by locking one or more layers) of the one or more images and/or models. The locking at 604 can render the subject one or more features hidden from display. Further, the locking at 604 can utilize password protection, biometric protection, and/or encryption technologies to generate a virtual lock. Moreover, the locking at 604 can be performed in accordance with one or more security preferences, which can the predefined by a user of the system 100 (e.g., via the one or more HMIs 108).

At 606, the method 600 can comprise unlocking (e.g., via the one or more HMIs 108) the locked one or more features in response to an authorization credential (e.g., a password, a biometric, and/or an encryption key). The authorization credential can be inputted into the system 100 via the one or more HMIs 108. The unlocking at 606 can render the previously locked features visible on a display of the one or more images and/or models (e.g., via one or more displays 126).

Figure 7:
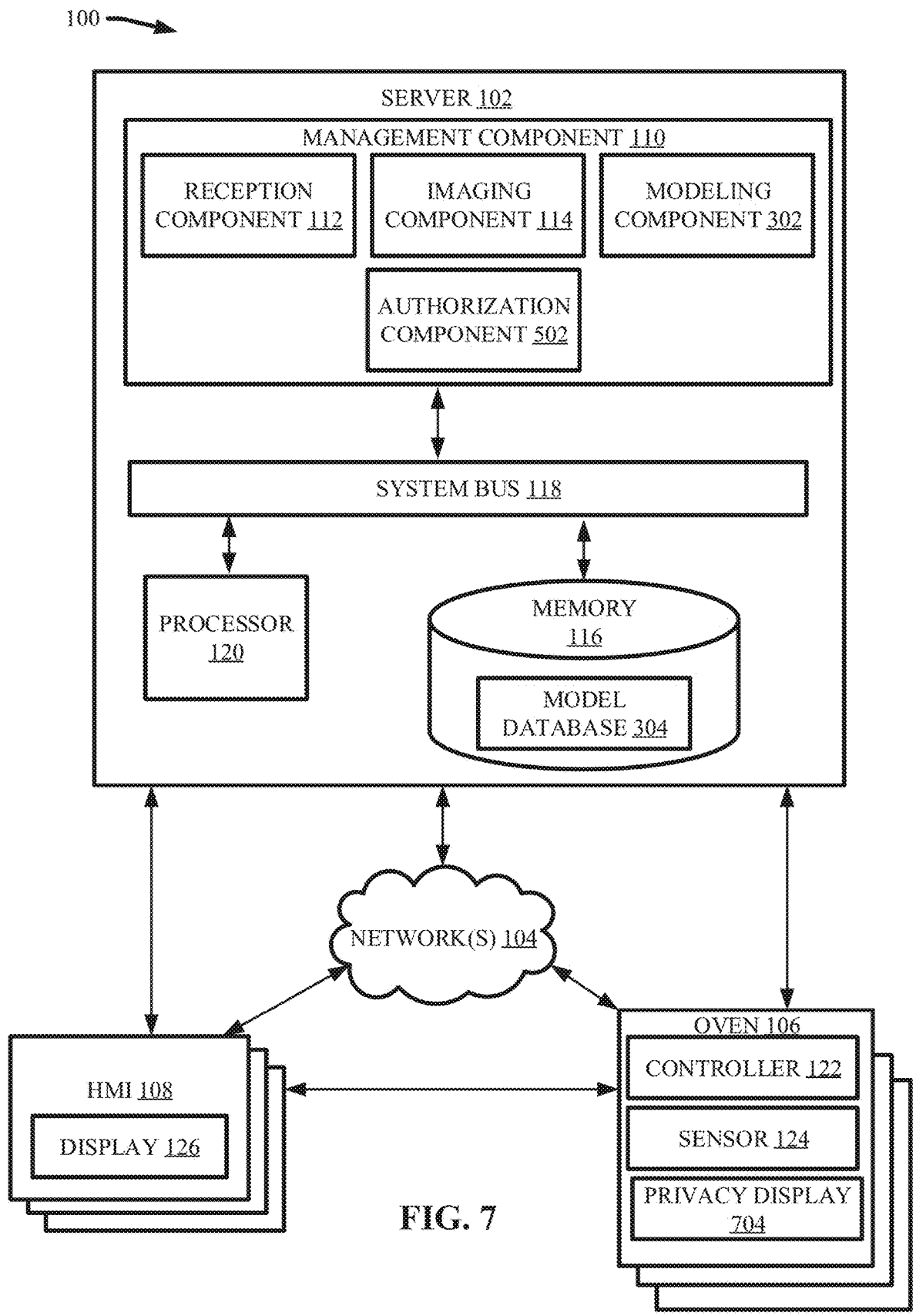
FIG. 7 illustrates another block diagram of an example, non-limiting system that can facilitate locking and/or displaying baking information regarding an oven in accordance with one or more embodiments described herein.

FIG. 7 illustrates a block diagram of the example, non-limiting system 100 further comprising one or more privacy displays 702. Repetitive description of like elements employed in other embodiments described herein is omitted for sake of brevity.

The one or more privacy displays 702 can comprise the one or more ovens 106. For example, the one or more privacy displays 702 can be located on or adjacent to the one or more ovens 106. The one or more privacy displays 702 can display system 100 generated images (e.g., by imaging component 114) and/or models (e.g., by modeling component 302) regarding baking parameters and/or product characteristics associated with an oven 106 comprising the subject one or more privacy displays 702. Further, the one or more privacy displays 702 can display the generated images and/or models in a format that is not readily visible to human eyesight. For example, the one or more privacy displays 702 can be polarized, thereby presenting a white and/or blank display to an observer. However, the images and/or models presented on the one or more privacy displays 702 can become visible to a user of the system 100 through the use of one or more vision augmentation devices (e.g., polarized glasses). Thus, a user of the system 100 utilizing a vision augmentation device compatible with the one or more privacy displays 702 can view the images and/or models presented on the one or more privacy displays 702, while others cannot view said images and/or models.

The one or more privacy displays 702 can receive generated images and/or models from the one or more servers 102 (e.g., the imaging component 114, modeling component 302, and/or memory 116) upon generation of said images and/or models or in predetermined time intervals. For example, the one or more privacy displays can receive the generated images and/or models via the one or more networks 104, such as a cloud environment.

Figure 8:
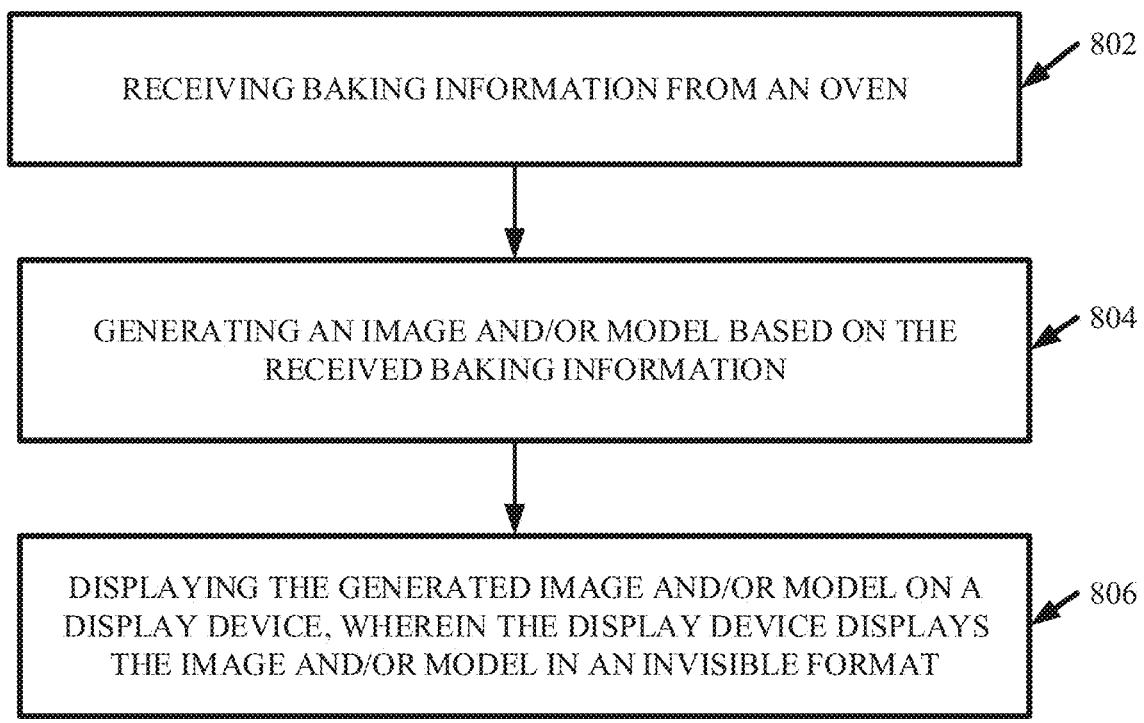
FIG. 8 illustrates a flow diagram of an example, non-limiting method that can facilitate displaying baking information regarding an oven in an invisible format in accordance with one or more embodiments described herein.

FIG. 8 illustrates a flow diagram of an example, non-limiting method 800 that can facilitate conveying baking information via the system 100 in accordance with one or more embodiments described herein. Repetitive description of like elements employed in other embodiments described herein is omitted for sake of brevity.

At 802, the method 800 can comprising receiving baking information from an oven 106. The baking information can comprise baking parameters and/or product characteristics regarding a bake and/or an oven 106. The baking information can be received (e.g., by reception component 112) from one or more ovens 106 (e.g., one or more controllers 122 and/or one or more sensors 124) via one or more networks 104.

At 804, the method 800 can comprise generating one or more images (e.g., by imaging component 114) and/or models (e.g., by modeling component 302) based on the received baking information. The one or more images and/or models can comprise designs, symbols, text, figures, graphs, photos, videos, a combination thereof, and/or the like. The one or more images and/or models can illustrate and/or otherwise convey the received baking information (e.g., baking parameters and/or product characteristics). The one or more images and/or models can be generated in response to receiving the baking information.

At 806, the method 800 can comprise displaying the generated one or more images on one or more display devices (e.g., privacy displays 702) for a user of the system 100 to view. The one or more display devices (e.g., privacy displays 702) can display the one or more images and/or models in an invisible format. For example, a casual observer of the display devices (e.g., privacy displays 702) would not be able to view the generated images and/or models despite the images and/or models being displayed on the display device (e.g., privacy display 702). To view the generated images and/or models, a user of the system 100 could view the one or more display devices (e.g., privacy displays 702) with one or more vision augmentation devices (e.g., polarized glasses). Said one or more vision augmentation devices can render the one or more images and/or models visible to the user. Thus, baking information can be publicly displayed on and/or adjacent to one or more ovens 106 while still maintaining the privacy of said baking information as it is visible only to users of the system 100.

Figure 9:
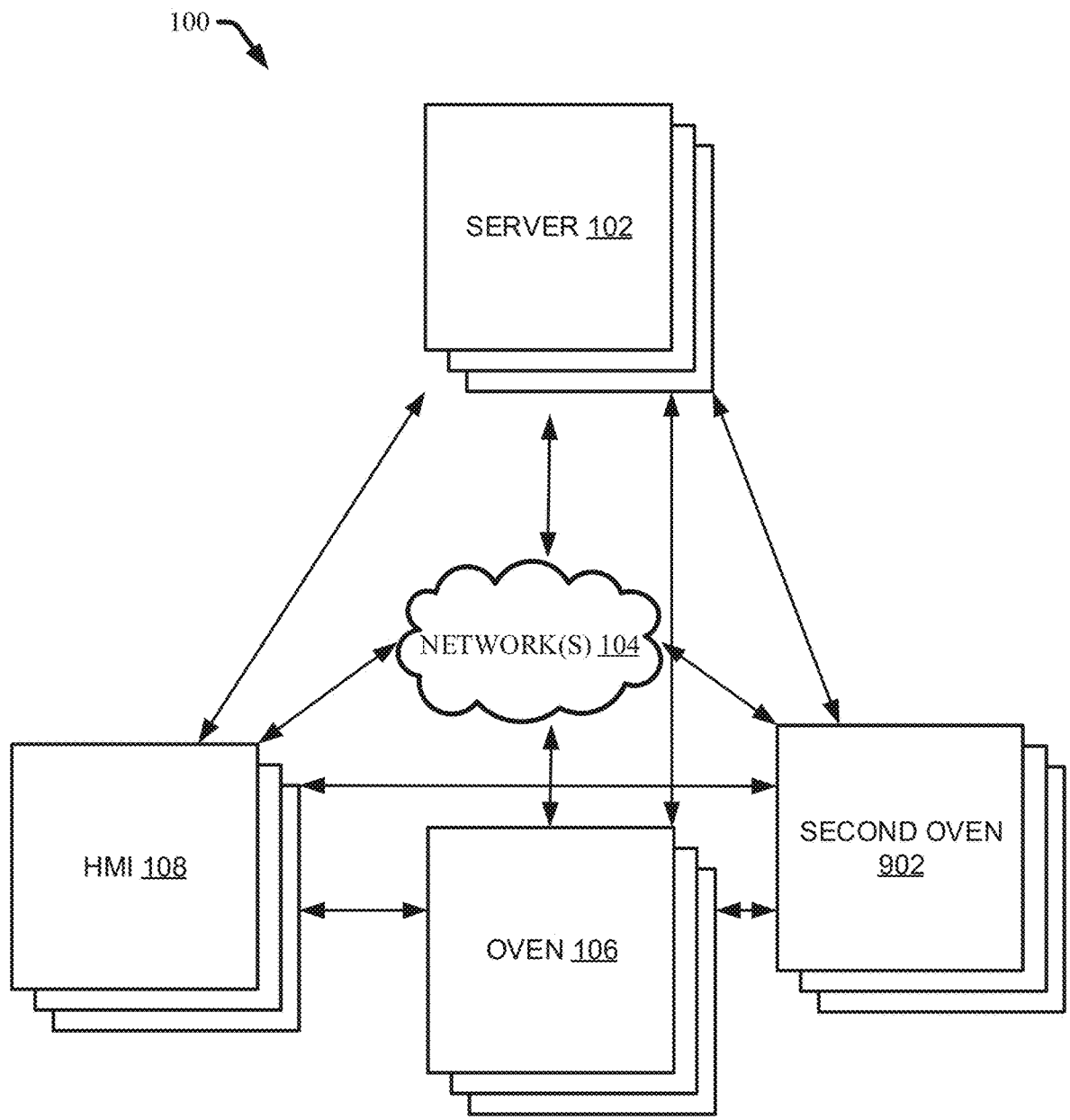
FIG. 9 illustrates another block diagram of an example, non-limiting system that can facilitate locking and/or displaying baking information regarding a plurality of ovens in accordance with one or more embodiments described herein.

FIG. 9 illustrates a block diagram of the example, non-limiting system 100 comprising one or more second ovens 902. Repetitive description of like elements employed in other embodiments described herein is omitted for sake of brevity. FIG. 9 shows that various embodiments of the system 100 can comprise a plurality of ovens 106 connected to one or more servers 102 and/or one or more HMIs 108 (e.g., via one or more networks 104).

The one or more second ovens 902 can comprise equivalent features, devices, and/or components of the oven 106 described herein. For example, the one or more second ovens 902 can comprise one or more controllers 122, one or more sensors 124, and/or one or more privacy displays 702. The oven 106 and/or the one or more second ovens 902 can be connected (e.g., directly or via one or more networks 104) to a common server 102. Thus, the server 102 can generate images, models, and locks for both the oven 106 and the one or more second ovens 902. Similarly, the oven 106 and/or the one or more second ovens 902 can be connected (e.g., directly or via one or more networks 104) to a common HMI 108. Thus, the HMI 108 can generate requests and/or display images and/or models regarding the oven 106 and/or the one or more second ovens 902.

Figure 10:
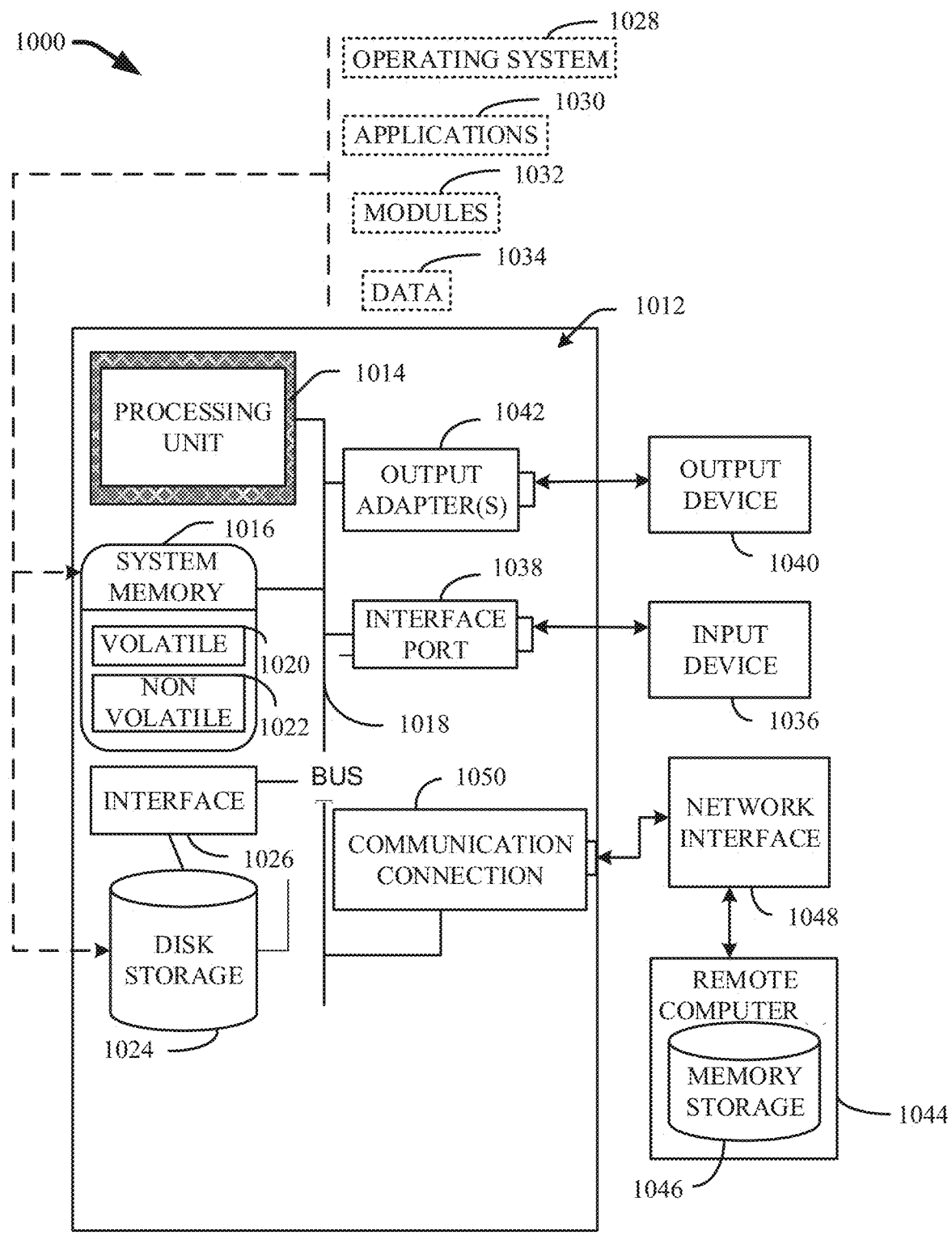
FIG. 10 illustrates a block diagram of an example, non-limiting operating environment in which one or more embodiments described herein can be facilitated.

To provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1000 for implementing various aspects of this disclosure can include a computer 1012. The computer 1012 can also include a processing unit 1014, a system memory 1016, and a system bus 1018. The system bus 1018 can operably couple system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, can be stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface can be used, such as interface 1026. FIG. 10 also depicts software that can act as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 can take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through one or more input devices 1036. Input devices 1036 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1014 through the system bus 1018 via one or more interface ports 1038. The one or more Interface ports 1038 can include, for example, a serial port, a parallel port, a game port, and a universal serial bus (USB). One or more output devices 1040 can use some of the same type of ports as input device 1036. Thus, for example, a USB port can be used to provide input to computer 1012, and to output information from computer 1012 to an output device 1040. Output adapter 1042 can be provided to illustrate that there are some output devices 1040 like monitors, speakers, and printers, among other output devices 1040, which require special adapters. The output adapters 1042 can include, by way of illustration and not limitation, video and sound cards that provide a means of connection between the output device 1040 and the system bus 1018. It should be noted that other devices and/or systems of devices provide both input and output capabilities such as one or more remote computers 1044.

Computer 1012 can operate in a networked environment using logical connections to one or more remote computers, such as remote computer 1044. The remote computer 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer 1044. Remote computer 1044 can be logically connected to computer 1012 through a network interface 1048 and then physically connected via communication connection 1050. Further, operation can be distributed across multiple (local and remote) systems. Network interface 1048 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components;
   a processor, operably coupled to the memory, and that executes the computer executable components stored in the memory, wherein the computer executable components comprise:
   an imaging component that generates an image regarding a characteristic of a product being baked within an oven, wherein the characteristic is determined by a sensor comprised within the oven; and
   a display component that displays the image via a human-machine interface that augments visual perception of the oven with the characteristic of the product, wherein the sensor is a drone traveling a defined flight path within the oven.

2. The system of claim 1, wherein the characteristic is at least one member selected from the group consisting of: a length of the product, a width of the product, a height of the product, a weight of the product, a temperature of the product, a color of the product, and a hardness of the product.

3. The system of claim 1, wherein the display component displays the image in response to a display request generated by the human-machine interface and triggered by a proximity of the human-machine interface to the oven.

4. The system of claim 3, wherein the display component augments the visual perception of the oven via at least one process of: displaying the image onto a transparent media overlaying a view of an environment surrounding the oven and displaying the image overlaying a captured image of the environment surrounding the oven.

5. The system of claim 1, further comprising a modeling component that generates a model based on the characteristic of the product, wherein the model includes a visual representation of the product and a current status of the product within the oven, and wherein the display component further displays the model.

6. The system of claim 5, wherein the image comprises a first feature and the model comprises a second feature; wherein the first feature and the second feature are locked by a technology selected from a group consisting of password protection, biometric protection and encryption; and wherein the locking prevents the first feature and the second feature from being displayed by the display component.

7. A computer-implemented method, comprising:
generating, by a system operatively coupled to a processor, an image regarding a characteristic of a product being baked within an oven, wherein the characteristic is determined by a sensor comprised within the oven; and
displaying, by the system, the image on a human-machine interface that augments visual perception of the oven with the characteristic of the product,
wherein the sensor is a drone traveling a defined flight path within the oven.

8. The computer-implemented method of claim 7, wherein the characteristic is at least one member selected from the group consisting of: a length of the product, a width of the product, a height of the product, a weight of the product, a temperature of the product, a color of the product, and a hardness of the product.

9. The computer-implemented method of claim 7, wherein the displaying is in response to a display request generated by the human-machine interface and triggered by a proximity of the human-machine interface to the oven.

10. The computer-implemented method of claim 9, wherein the displaying comprises at least one of: displaying the image onto a transparent media overlaying a view of an environment surrounding the oven and displaying the image overlaying a captured image of an environment surrounding the oven.

11. The computer-implemented method of claim 7, further comprising generating a model based on the characteristic of the product, wherein the model includes a visual representation of the product and a current status of the product within the oven, and wherein the displaying further displays the model on the display device.

12. The computer-implemented method of claim 11, wherein the image comprises a first feature and the model comprises a second feature, wherein the computer-implemented method further comprises locking the first feature and the second feature, wherein the locking prevents displaying the first feature and the second feature when displaying the image and the model, and wherein the locking comprises a technology selected from a group consisting of password protection, biometric protection and encryption.

13. A computer program product for displaying baking information, the computer program product comprising a computer readable storage medium having program instructions embodied therewith, the program instructions executable by a processor to cause the processor to:
generate an image regarding a characteristic of a product being baked within an oven, wherein the characteristic is determined by a sensor comprised within the oven; and
display the image on a human-machine interface that augments visual perception of the oven with the characteristic of the product,
wherein the sensor is a drone traveling a defined flight path within the oven.

14. The computer program product of claim 13, wherein the characteristic is at least one member selected from the group consisting of: a length of the product, a width of the product, a height of the product, a weight of the product, a temperature of the product, a color of the product, and a hardness of the product.

15. The computer program product of claim 13, wherein the image is displayed in response to a display request generated by the human-machine interface and triggered by a proximity of the human-machine interface to the oven.

16. The computer program product of claim 15, wherein the image is displayed via at least one process of: displaying the image onto a transparent media overlaying a view of an environment surrounding the oven, and overlaying a captured image of an environment surrounding the oven.

17. The computer program product of claim 13, wherein the program instructions further causes the processor to generate a model based on the characteristic of the product, wherein the model includes a visual representation of the product and a current status of the product within the oven.

18. The computer program product of claim 17, wherein the image comprises a first feature and the model comprises a second feature, wherein the program instructions further causes the processor to lock the first feature and the second feature thereby preventing display of the first feature and the second feature when the image and the model are displayed, and wherein locking the first feature and the second feature comprises a technology selected from a group consisting of password protection, biometric protection and encryption.

* * * * *